(12) United States Patent
Gu

(10) Patent No.: US 11,556,347 B2
(45) Date of Patent: Jan. 17, 2023

(54) INFORMATION PROCESSING DEVICE AND INFORMATION PROCESSING METHOD

(71) Applicant: TOSHIBA TEC KABUSHIKI KAISHA, Tokyo (JP)

(72) Inventor: Yufei Gu, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 17/238,465

(22) Filed: Apr. 23, 2021

(65) Prior Publication Data

US 2022/0058028 A1   Feb. 24, 2022

(30) Foreign Application Priority Data

Aug. 19, 2020  (JP) .............................. JP2020-138617

(51) Int. Cl.
| | | |
|---|---|---|
| *G06F 9/44* | (2018.01) | |
| *G06F 9/4401* | (2018.01) | |
| *G06F 11/34* | (2006.01) | |
| *G06F 11/30* | (2006.01) | |
| *G06F 1/24* | (2006.01) | |

(52) U.S. Cl.
CPC .............. *G06F 9/4403* (2013.01); *G06F 1/24* (2013.01); *G06F 11/3024* (2013.01); *G06F 11/3419* (2013.01)

(58) Field of Classification Search
CPC ...... G06F 9/4403; G06F 1/24; G06F 11/3024; G06F 11/3419
See application file for complete search history.

(56) References Cited

U.S. PATENT DOCUMENTS

| | | | |
|---|---|---|---|
| 9,524,177 B2 | 12/2016 | Ito | |
| 2015/0214933 A1* | 7/2015 | Sehgal | ................. H03K 3/0375 326/94 |
| 2016/0209818 A1* | 7/2016 | Mandle | ............... H04L 41/0823 |
| 2018/0121280 A1* | 5/2018 | Sanders | ............. G06F 11/0757 |
| 2018/0241399 A1* | 8/2018 | Sharma | ................... G06F 1/263 |

FOREIGN PATENT DOCUMENTS

| | | | | |
|---|---|---|---|---|
| EP | 2680560 A2 * | 1/2014 | ........ | G06F 17/5054 |
| JP | 2014-010549 | 1/2014 | | |
| WO | WO-9636925 A1 * | 11/1996 | ............ | G06F 11/006 |

* cited by examiner

*Primary Examiner* — Zahid Choudhury
(74) *Attorney, Agent, or Firm* — Foley & Lardner LLP

(57) ABSTRACT

An objective is to provide an information processing device that can be started up stably, and an information processing method. A configuration execution unit of an information processing device writes configuration data into an FPGA. A clock signal monitoring unit detects whether a clock signal supplied from a CPU to the FPGA is stable or not, on condition that a configuration is complete. A startup processing unit starts up the CPU and the FPGA on condition that the clock signal is stable.

15 Claims, 4 Drawing Sheets

INFORMATION PROCESSING DEVICE AND INFORMATION PROCESSING METHOD

CROSS-REFERENCE TO RELATED APPLICATION

This application is based upon and claims the benefit of priority from Japanese Patent Application No. 2020-138617, filed on Aug. 19, 2020, the entire contents of which are incorporated herein by reference.

FIELD

Embodiments described herein relate generally to an information processing device and an information processing method.

BACKGROUND

To start up a system including an FPGA (field-programmable gate array) and a CPU (central processing unit), a configuration is performed first. That is, the FPGA reads out circuit information from a ROM (read-only memory) and configures a logic circuit inside the FPGA. After the configuration is completed, a wait signal to the CPU is cancelled and the CPU is started up.

DETAILED DESCRIPTION

In a typical system as described above, if firmware to be executed by the CPU is set on the CPU immediately after the wait signal to the CPU is cancelled, a clock signal outputted by the CPU may become unstable. Due to the instability of the clock signal, the CPU and the FPGA may not be able to be started up normally. No description or suggestion about such instability of the clock signal has been provided.

At least one embodiment described herein is to provide an information processing device that can be started up stably, and an information processing method.

In general, according to one embodiment, an information processing device includes an FPGA and a CPU and also includes a configuration execution unit, a clock signal monitoring unit, and a startup processing unit. The configuration execution unit writes configuration data into the FPGA. The clock signal monitoring unit detects whether a clock signal supplied from the CPU to the FPGA is stable or not, on condition that a configuration is complete. The startup processing unit starts up the CPU and the FPGA on condition that the clock signal is stable.

An information processing device 10 as at least one embodiment will now be described with reference to the drawings.

Description of Schematic Configuration of Information Processing Device

Figure 1:
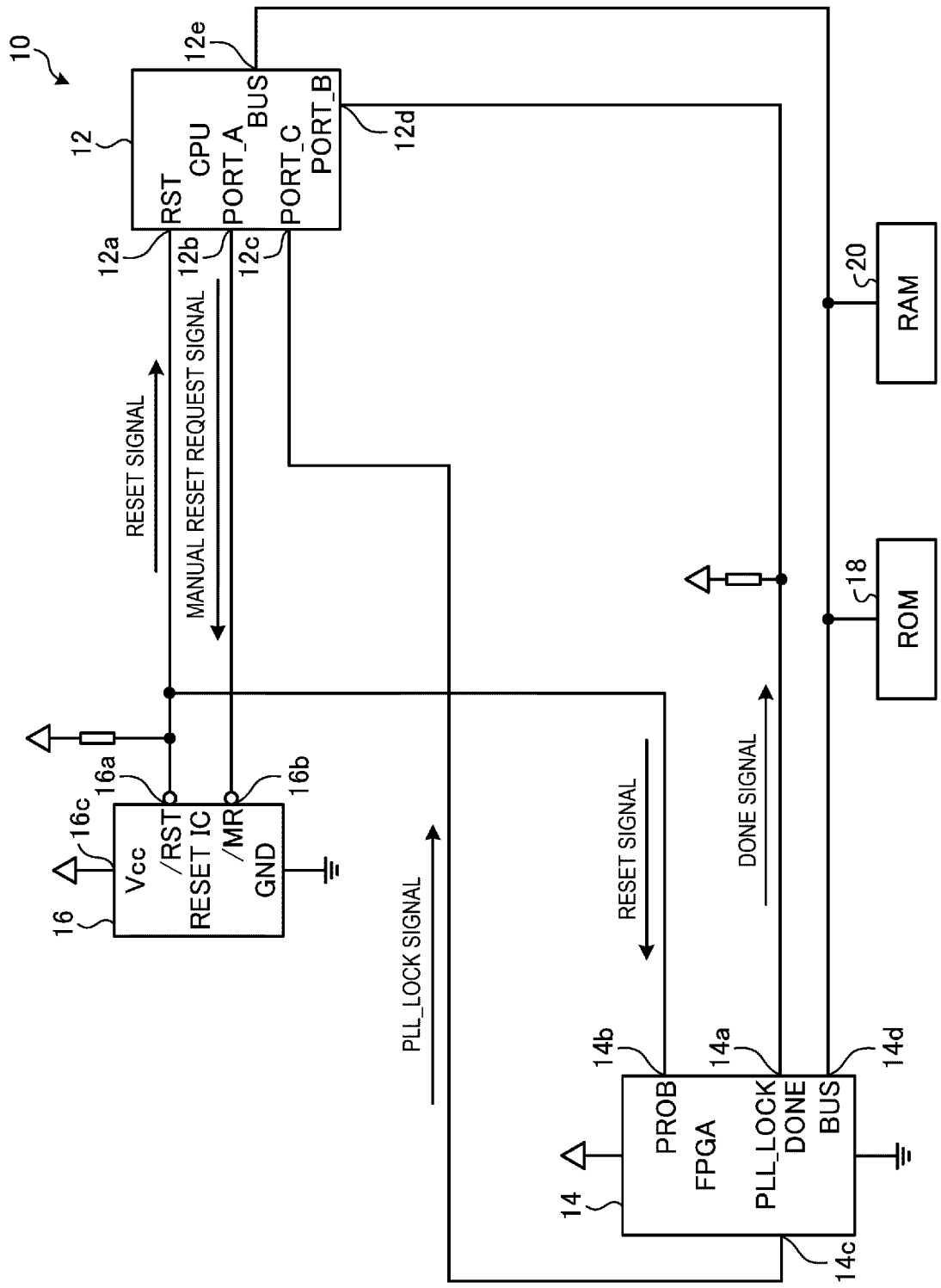
FIG. 1 is a block diagram showing an example of the schematic configuration of an information processing device according to at least one embodiment.

FIG. 1 is a block diagram showing an example of the schematic configuration of the information processing device according to at least one embodiment. The information processing device 10 is built, for example, in an electronic apparatus such as a printer device or a POS (point of sales) terminal and controls operations of the electronic apparatus.

The information processing device 10 has a CPU 12, an FPGA 14, a reset IC 16, a ROM 18, and a RAM (random-access memory) 20.

The CPU 12 generates a reference clock signal that drives the information processing device 10. The generated reference clock signal is supplied to the FPGA 14 via a clock line, not illustrated in FIG. 1. The CPU 12 also reads out firmware stored in the ROM 18 and sets the read-out firmware in such a way as to be executable by the CPU 12. The CPU 12 causes the set firmware to operate according to a control program stored in the ROM 18 and thus causes the information processing device 10 to operate. The CPU 12 also detects whether the FPGA 14 has generated a stable clock signal or not, based on the clock signal supplied from the CPU 12 itself. Then, on condition that the FPGA 14 has generated a stable clock signal, startup processing to start up the CPU 12 and the FPGA 14 is performed.

The FPGA 14 is an integrated circuit that can rewrite the configuration of an inner logic circuit at any time, using hardware description language such as VHDL (VHSIC HDL), Verilog, or HDL. Implementing particular processing using the FPGA 14 enables higher-speed processing than when the CPU 12 performs the same processing. The FPGA 14 reads out configuration data stored in the ROM 18. The FPGA 14 then performs a so-called configuration, that is, writing the read-out configuration data into the FPGA 14 itself and thus generating a logic circuit. The FPGA 14 also causes the generated logic circuit to operate and thus causes the information processing device 10 to perform an operation corresponding to the generated logic circuit. That is, the information processing device 10 operates, based on the cooperation between the CPU 12 and the FPGA 14.

The reset IC 16 controls a reset operation on the CPU 12 and the FPGA 14. Specifically, the reset IC 16 performs a forced reset on the CPU 12 and the FPGA 14. The reset IC 16 also performs a manual reset on the CPU 12 in response to a reset request from the CPU 12.

The ROM 18 stores the firmware set on the CPU 12, the control program operated by the CPU 12, and the configuration data written into the FPGA 14 or the like. The firmware set on the CPU 12, the control program operated by the CPU 12, and the configuration data written into the FPGA 14 or the like may be stored in a memory device such as a flash memory connected to an internal bus.

The RAM 20 stores the control program read out from the ROM 18 by the CPU 12. The control program stored in the RAM 20 is read out and executed by the CPU 12. The RAM 20 is also used as a memory for temporarily storing information according to need when the CPU 12 executes the control program.

The flow of signals between the components forming the information processing device 10 will now be described with reference to FIG. 1.

The reset IC 16 monitors the voltage of a Vcc terminal 16c and thus monitors the power activation state of the information processing device 10. On detecting that the power of the information processing device 10 is turned on and stabilized, the reset IC 16 outputs a reset signal to the CPU 12 and the FPGA 14 from a /RST terminal 16a. A /MR terminal 16b of the reset IC 16 receives a manual reset request signal from the CPU 12.

A RST terminal 12a of the CPU 12 receives a reset signal from the reset IC 16. A PORT_A terminal 12b of the CPU 12 transmits a manual reset request signal to the reset IC 16. A PORT_B terminal 12d receives a DONE signal indicating that a configuration is complete, from the FPGA 14. A PORT C terminal 12c of the CPU 12 receives a PLL_LOCK signal indicating that a clock signal supplied from the CPU 12 to the FPGA 14 is stable or not, from the FPGA 14. A BUS terminal 12e of the CPU 12 transmits and receives necessary information for causing the information processing device 10 to operate, via an internal bus connecting the CPU 12, the FPGA 14, the ROM 18, and the RAM 20 together.

A DONE terminal 14a of the FPGA 14 transmits a DONE signal to the CPU 12. A PROB terminal 14b of the FPGA 14 receives a reset signal from the reset IC 16. A PLL_LOCK terminal 14c of the FPGA 14 transmits a PLL_LOCK signal to the CPU 12. A BUS terminal 14d of the FPGA 14 transmits and receives necessary information for causing the information processing device 10 to operate, via the internal bus connecting the CPU 12, the FPGA 14, the ROM 18, and the RAM 20 together.

Description of Functional Configuration of Information Processing Device

Figure 2:
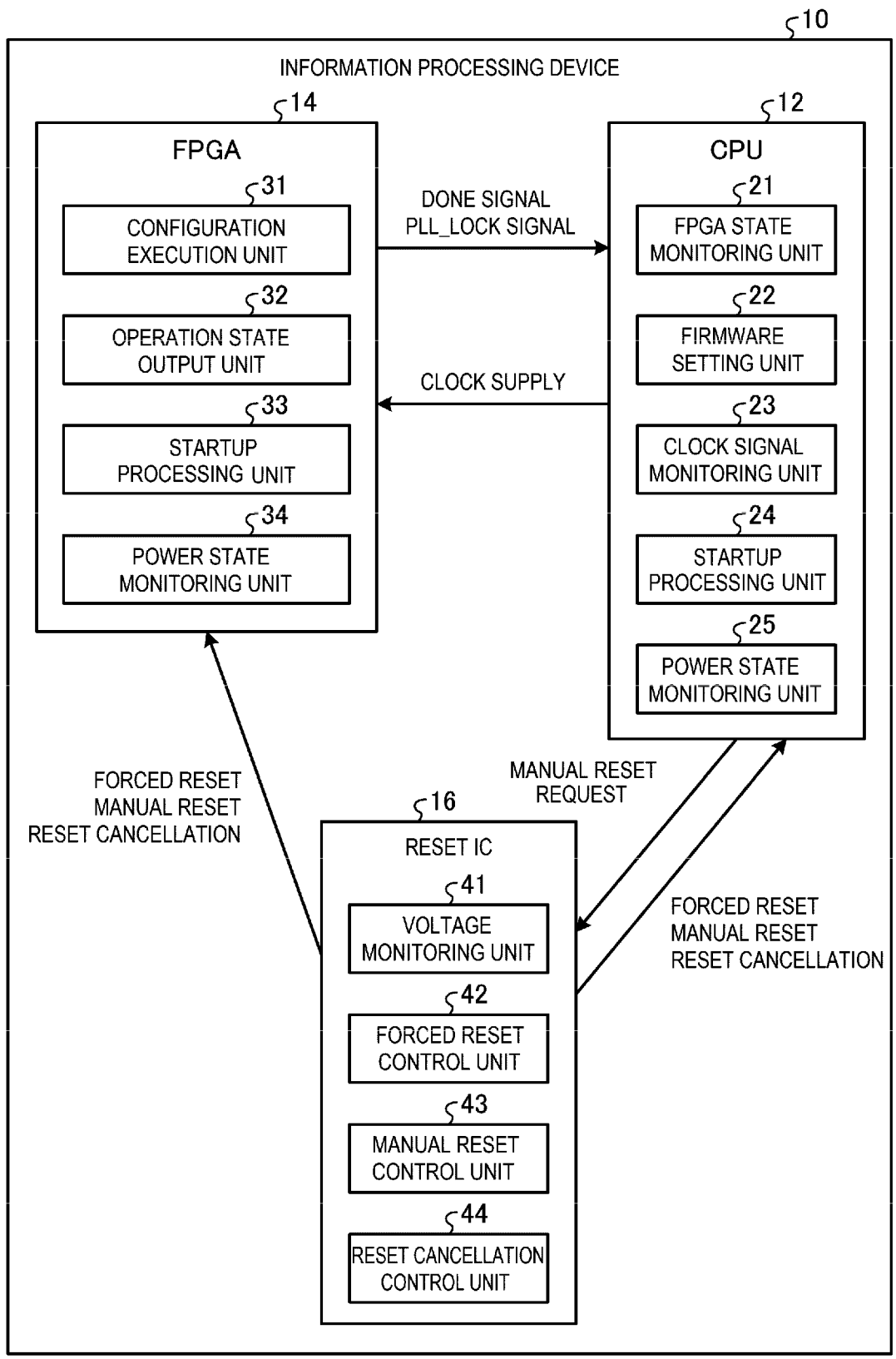
FIG. 2 is a functional block diagram showing an example of the functional configuration of the information processing device.

FIG. 2 is a functional block diagram showing an example of the functional configuration of the information processing device according to at least one embodiment. The CPU 12, the FPGA 14, and the reset IC 16 execute the control program stored in the ROM 18 and thus implement each functional unit shown in FIG. 2.

That is, the CPU 12 implements an FPGA state monitoring unit 21, a firmware setting unit 22, a clock signal monitoring unit 23, a startup processing unit 24, and a power state monitoring unit 25.

The FPGA state monitoring unit 21 monitors a DONE signal outputted from the FPGA 14 and thus determines whether the FPGA 14 has completed a configuration or not.

The firmware setting unit 22 writes firmware read out from the ROM 18 into the CPU 12 and thus sets the firmware in an operable state.

The clock signal monitoring unit 23 detects whether a clock signal supplied from the CPU 12 to the FPGA 14 is stable or not, on condition that the FPGA 14 has completed the configuration. More specifically, the CPU 12 determines whether the clock signal is stable or not, based on the state of a PLL_LOCK signal received from the FPGA 14 and indicating whether the clock signal supplied from the CPU 12 to the FPGA 14 is stable or not. The PLL_LOCK signal is generated, based on a phase difference and a frequency difference between the clock signal supplied from the CPU 12 to the FPGA 14 and the clock signal generated by the FPGA 14 based on that clock signal. More specifically, the if the clock signal supplied from the CPU 12 to the FPGA 14 is determined as stable, the FPGA 14 sets the PLL_LOCK signal to high level. Meanwhile, if the clock signal supplied from the CPU 12 to the FPGA 14 is not determined as stable, the FPGA 14 sets the PLL_LOCK signal to low level.

The startup processing unit 24 starts up the CPU 12 and the FPGA 14 on condition that the clock signal supplied from the CPU 12 to the FPGA 14 is stable. The startup processing unit 24 outputs a manual reset request signal to the reset IC 16 on condition that the clock signal supplied from the CPU 12 to the FPGA 14 is unstable over a predetermined period of time. The startup processing unit 24 resets the CPU 12 in response to a reset request from the reset IC 16. The startup processing unit 24 cancels the reset of the CPU 12 in response to a reset cancellation request from the reset IC 16.

The power state monitoring unit 25 monitors the state of electric power supplied to the CPU 12, specifically, whether the power is turned on or cut off.

The FPGA 14 implements a configuration execution unit 31, an operation state output unit 32, a startup processing unit 33, and a power state monitoring unit 34.

The configuration execution unit 31 writes configuration data read out from the ROM 18 into the FPGA 14.

The operation state output unit 32 outputs a DONE signal indicating that the FPGA 14 has completed the configuration or not, and a PLL_LOCK signal indicating whether the clock signal supplied from the CPU 12 to the FPGA 14 is stable or not.

The startup processing unit 33 resets the FPGA 14 in response to a reset request from the reset IC 16. The startup processing unit 33 cancels the reset of the FPGA 14 in response to a reset cancellation request from the reset IC 16.

The power state monitoring unit 34 monitors the state of electric power supplied to the FPGA 14, specifically, whether the power is turned on or cut off.

The reset IC 16 implements a voltage monitoring unit 41, a forced reset control unit 42, a manual reset control unit 43, and a reset cancellation control unit 44.

The voltage monitoring unit 41 monitors the state of electric power supplied to the reset IC 16, specifically, whether the power is turned on or cut off. The voltage monitoring unit 41 also monitors whether the voltage level supplied to the reset IC 16 is stable or not.

The forced reset control unit 42 executes a forced reset on the CPU 12 and the FPGA 14, on confirming that the power of the information processing device 10 is turned on.

The manual reset control unit 43 causes the CPU 12 and the FPGA 14 to be manually reset, on condition that the manual reset control unit 43 has received a manual reset request signal outputted from the CPU 12. The CPU 12 outputs a manual reset request signal on condition that the CPU 12 recognizes that the clock signal supplied from the CPU 12 to the FPGA 14 is unstable over a predetermined period of time by monitoring the PLL_LOCK signal outputted from the FPGA 14.

The reset cancellation control unit 44 cancels the reset state of the CPU 12 and the FPGA 14.

Description of Flow of Processing Performed by Information Processing Device

Figure 3:
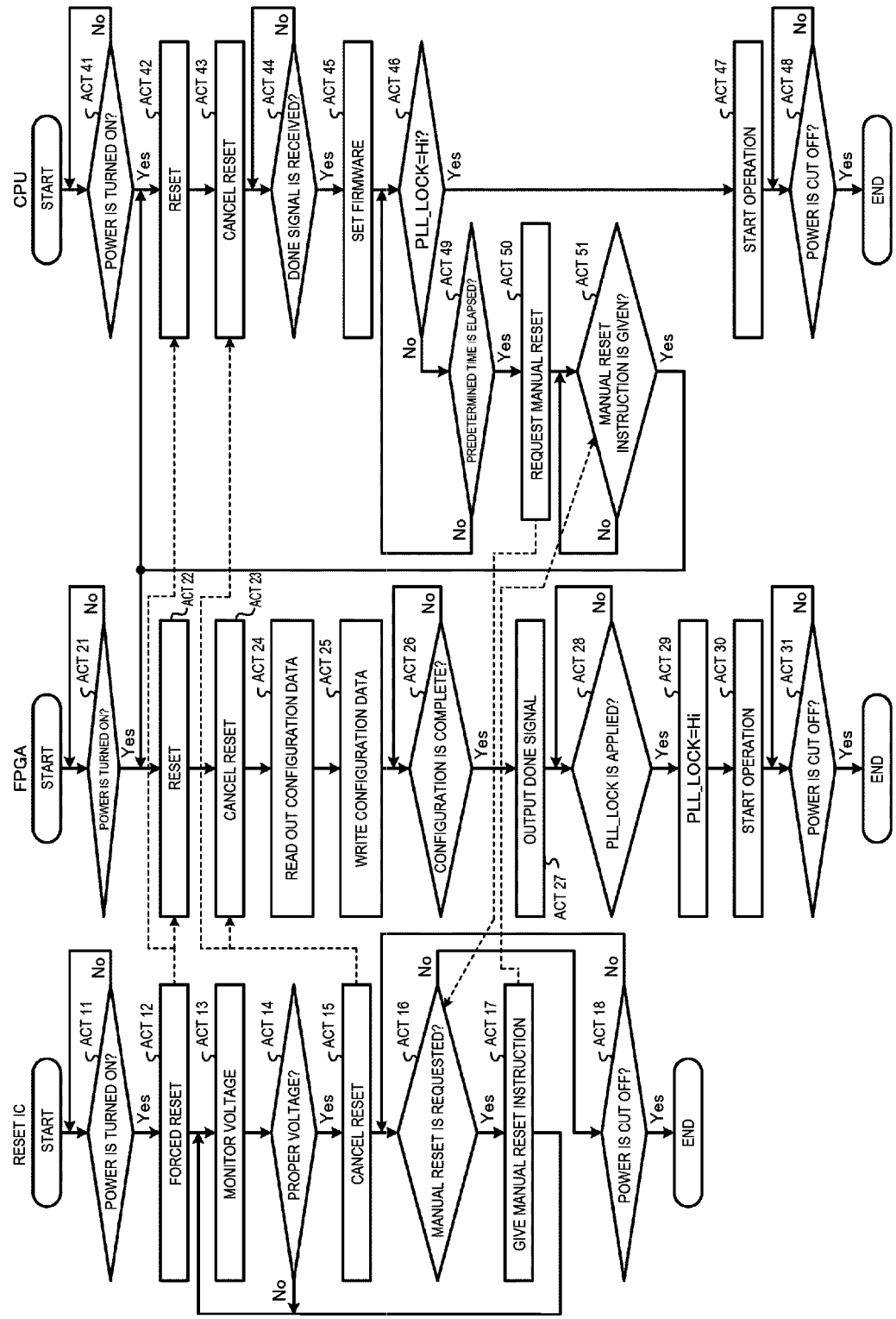
FIG. 3 is a flowchart showing an example of the flow of processing performed by the information processing device.

FIG. 3 is a flowchart showing an example of the flow of processing performed by the information processing device according to the embodiment. Hereinafter, the flow of processing performed by the information processing device 10 is described separately for the reset IC 16, the FPGA 14, and the CPU 12.

Description of Flow of Processing Performed by Reset IC

The voltage monitoring unit 41 determines whether the power of the reset IC 16 is turned on or not (ACT 11). If it is determined that the power of the reset IC 16 is turned on (Yes in ACT 11), the processing proceeds to ACT 12. Meanwhile, if it is not determined that the power of the reset IC 16 is turned on (No in ACT 11), ACT 11 is repeated.

If the result of the determination in ACT 11 is Yes, the forced reset control unit 42 performs a forced reset on the CPU 12 and the FPGA 14 (ACT 12).

The voltage monitoring unit 41 then monitors the voltage level supplied to the reset IC 16 (ACT 13).

The voltage monitoring unit 41 determines whether the voltage level supplied to the reset IC 16 is proper (stable) or not (ACT 14). If it is determined that the voltage level supplied to the reset IC 16 is proper (Yes in ACT 14), the processing process proceeds to ACT 15. Meanwhile, if it is not determined that the voltage level supplied to the reset IC 16 is proper (No in ACT 14), the processing returns to ACT 13.

If the result of the determination in ACT 14 is Yes, the reset cancellation control unit 44 cancels the reset of the CPU 12 and the FPGA 14 (ACT 15).

The manual reset control unit 43 determines whether a manual reset is requested by the CPU 12 or not (ACT 16). If it is determined that a manual reset is requested by the CPU (Yes in ACT 16), the processing proceeds to ACT 17. Meanwhile, if it is not determined that a manual reset is requested by the CPU 12 (No in ACT 16), the processing proceeds to ACT 18.

If the result of the determination in ACT 16 is Yes, the manual reset control unit 43 gives the CPU 12 an instruction to perform a manual reset (ACT 17). Subsequently, the processing returns to ACT 13.

Meanwhile, if the result of the determination in ACT 16 is No, the voltage monitoring unit 41 determines whether the power of the reset IC 16 is cut off or not (ACT 18). If it is determined that the power of the reset IC 16 is cut off (Yes in ACT 18), the reset IC 16 ends the processing shown in FIG. 3. Meanwhile, if it is not determined that the power of the reset IC 16 is cut off (No in ACT 18), the processing returns to ACT 16.

Description of Flow of Processing Performed by CPU

The flow of processing performed by the CPU 12 will now be described. First, the power state monitoring unit 25 determines whether the power of the CPU 12 is turned on or not (ACT 41). If it is determined that the power of the CPU 12 is turned on (Yes in ACT 41), the processing proceeds to ACT 42. Meanwhile, if it is not determined that the power of the CPU 12 is turned on (No in ACT 41), ACT 41 is repeated.

If the result of the determination in ACT 41 is Yes, the startup processing unit 24 resets the CPU 12 (ACT 42).

The startup processing unit 24 then cancels the reset of the CPU 12 in response to a reset cancellation request from the reset IC 16 (ACT 43).

The FPGA state monitoring unit 21 determines whether a DONE signal outputted from the FPGA 14 is received or not (ACT 44). If it is determined that a DONE signal outputted from the FPGA 14 is received (Yes in ACT 44), the processing proceeds to ACT 45. Meanwhile, if it is not determined that a DONE signal outputted from the FPGA 14 is received (No in ACT 44), ACT 44 is repeated.

If the result of the determination in ACT 44 is Yes, the firmware setting unit 22 sets firmware to be executed by the CPU 12 (ACT 45).

Next, the clock signal monitoring unit 23 determines whether a PLL_LOCK signal outputted from the FPGA 14 is at high level or not (ACT 46). If it is determined that the PLL_LOCK signal outputted from is at high level (Yes in ACT 46), the processing proceeds to ACT 47. Meanwhile, if it is not determined that the PLL_LOCK signal outputted from the FPGA 14 is at high level (No in ACT 46), the processing proceeds to ACT 49.

If the result of the determination in ACT 46 is Yes, the startup processing unit 24 causes the CPU 12 to start executing the firmware (ACT 47).

Next, the power state monitoring unit 25 determines whether the power of the CPU 12 is cut off or not (ACT 48). If it is determined that the power of the CPU 12 is cut off (Yes in ACT 48), the CPU 12 ends the processing shown in FIG. 3. Meanwhile, if it is not determined that the power of the CPU 12 is cut off (No in ACT 48), ACT 48 is repeated.

If the result of the determination in ACT 46 is No, the clock signal monitoring unit 23 determines whether a predetermined time is elapsed or not (ACT 49). If it is determined that the predetermined time is elapsed (Yes in ACT 49), the processing proceeds to ACT 50. Meanwhile, if it is not determined that the predetermined time is elapsed (No in ACT 49), the processing returns to ACT 46.

If the result of the determination in ACT 49 is Yes, the startup processing unit 24 outputs a manual reset request signal to the reset IC 16 (ACT 50).

The startup processing unit 24 determines whether an instruction to perform a manual reset is given by the reset IC 16 or not (ACT 51). If it is determined that an instruction to perform a manual reset is given by the reset IC 16 (Yes in ACT 51), the processing returns to ACT 42 and ACT 22. Meanwhile, if it is not determined that an instruction to perform a manual reset is given by the reset IC 16 (No in ACT 51), ACT 51 is repeated.

In this way, if the result of the determination in ACT 51 is Yes, the processing returns to ACT 22. The startup processing unit 33 resets the FPGA 14. The FPGA 14 is thus restarted.

Description of Flow of Processing Performed by FPGA

The flow of processing performed by the FPGA 14 will now be described. First, the power state monitoring unit 34 determines whether the power of the FPGA 14 is turned on or not (ACT 21). If it is determined that the power of the FPGA 14 is turned on (Yes in ACT 21), the processing proceeds to ACT 22. Meanwhile, if it is not determined that the power of the FPGA 14 is turned on (No in ACT 21), ACT 21 is repeated.

If the result of the determination in ACT 21 is Yes, the startup processing unit 33 resets the FPGA 14 (ACT 22). As described above, the startup processing unit 33 also resets the FPGA 14 in ACT 22 if the CPU 12 receives a manual reset instruction in ACT 51 (Yes in ACT 51).

Next, the startup processing unit 33 cancels the reset of the FPGA 14 in response to a reset cancellation request from the reset IC 16 (ACT 23).

The configuration execution unit 31 reads out configuration data from the ROM 18 (ACT 24).

The configuration execution unit 31 writes the read-out configuration data into the FPGA 14 (ACT 25).

The configuration execution unit 31 determines whether the configuration is complete or not (ACT 26). If it is determined that the configuration is complete (Yes in ACT 26), the processing proceeds to ACT 27. Meanwhile, if it is not determined that the configuration is complete (No in ACT 26), ACT 26 is repeated.

If the result of the determination in ACT 26 is Yes, the operation state output unit 32 outputs a DONE signal indicating that the configuration is complete (ACT 27).

The operation state output unit 32 determines whether PLL_LOCK is applied or not, that is, whether the clock signal supplied from the CPU 12 to the FPGA 14 is stable or not (ACT 28). If it is determined that PLL_LOCK is applied (Yes in ACT 28), the processing proceeds to ACT 29. Meanwhile, if it is not determined that PLL_LOCK is applied (No in ACT 28), ACT 28 is repeated.

If the result of the determination in ACT 28 is Yes, the operation state output unit 32 sets a PLL_LOCK signal to high level (ACT 29).

The startup processing unit 33 causes the FPGA 14 to start operating (ACT 30).

Next, the power state monitoring unit 34 determines whether the power of the FPGA 14 is cut off or not (ACT 31). If it is determined that the power of the FPGA 14 is cut off (Yes in ACT 31), the FPGA 14 ends the processing shown in FIG. 3. Meanwhile, if it is not determined that the power of the FPGA 14 is cut off (No in ACT 31), ACT 31 is repeated.

Figure 4:
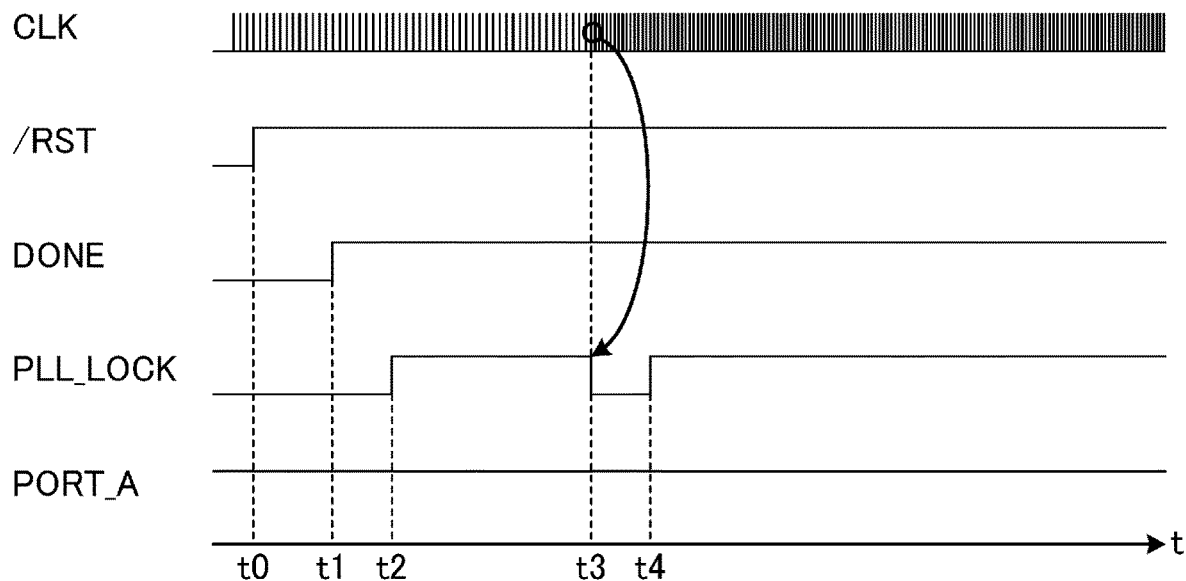
FIG. 4 is a time chart showing an example of the case where the information processing device is successful in startup processing.

Description of Time Chart Corresponding to where Information Processing Device is Successful in Startup Processing A time chart corresponding to where the information processing device 10 is successful in startup processing will now be described with reference to FIG. 4. FIG. 4 is a time chart showing an example of the case where the information processing device according to the embodiment is successful in startup processing.

It is now assumed that the reset IC 16 cancels the reset of the CPU 12 and the FPGA 14 at time to.

When the reset is cancelled, the FPGA 14 reads out configuration data from the ROM 18 and performs a configuration. On completion of the configuration, the FPGA 14 outputs a DONE signal at time t1.

The FPGA 14 determines whether the clock signal supplied from the CPU 12 is stable or not. On determining that the clock signal supplied from the CPU 12 is stable, the FPGA 14 changes the PLL_LOCK signal to high level at time t2.

Subsequently, the CPU 12 sets firmware which the CPU 12 itself is to operate. When firmware is set, the clock signal outputted from the CPU 12 may become unstable. The example shown in FIG. 4 shows that the clock signal outputted from the CPU 12 becomes unstable at time t3.

When the clock signal outputted from the CPU 12 has become unstable, the FPGA 14 determines that the clock signal outputted from the CPU 12 is unstable, and changes the PLL_LOCK signal to low level at time t3.

The FPGA 14 repeats the determination about whether the clock signal outputted from the CPU 12 is stable or not. At time t4, the FPGA 14 determines that the clock signal outputted from the CPU 12 is stable, and changes the PLL_LOCK signal to high level again.

From this point onward, the CPU 12 and the FPGA 14 start executing predetermined processing if the PLL_LOCK signal is kept at high level.

Figure 5:
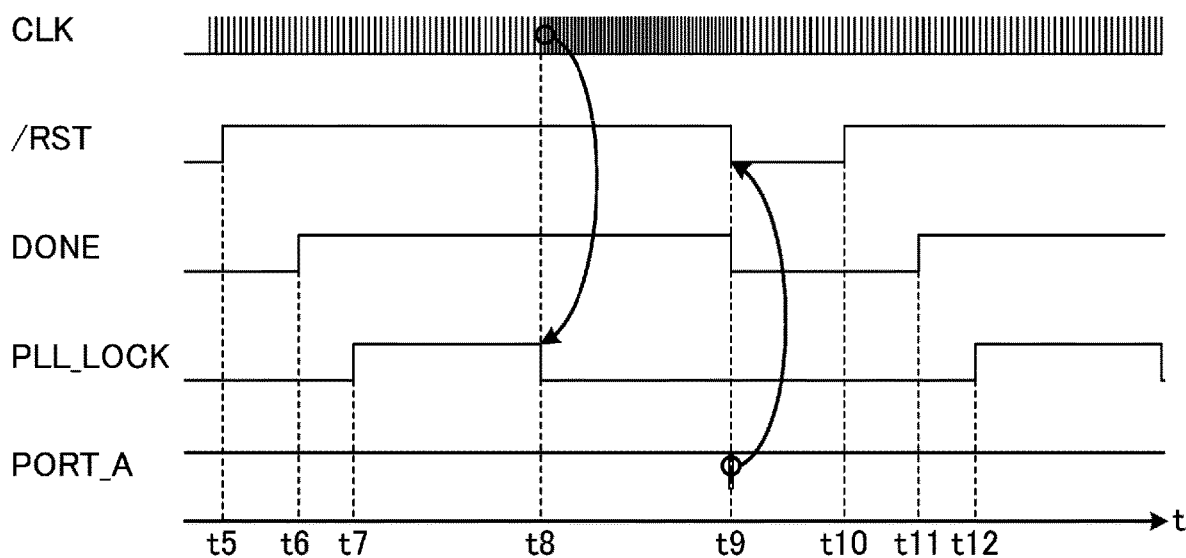
FIG. 5 is a time chart showing an example of the case where the information processing device is unsuccessful in startup processing.

Description of Time Chart Corresponding to where Information Processing Device is Unsuccessful in Startup Processing A time chart corresponding to where the information processing device 10 is unsuccessful in startup processing will now be described with reference to FIG. 5. FIG. 5 is a time chart showing an example of the case where the information processing device according to at least one embodiment is unsuccessful in startup processing.

It is now assumed that the reset IC 16 cancels the reset of the CPU 12 and the FPGA 14 at time t5.

When the reset is cancelled, the FPGA 14 reads out configuration data from the ROM 18 and performs a configuration. On completion of the configuration, the FPGA 14 outputs a DONE signal at time t6.

The FPGA 14 determines whether the clock signal supplied from the CPU 12 is stable or not. On determining that the clock signal supplied from the CPU 12 is stable, the FPGA 14 changes the PLL_LOCK signal to high level at time t7.

Subsequently, the CPU 12 sets firmware which the CPU 12 itself is to operate. When firmware is set, the clock signal outputted from the CPU 12 may become unstable. The example shown in FIG. 5 shows that the clock signal outputted from the CPU 12 becomes unstable at time t8.

When the clock signal outputted from the CPU 12 has become unstable, the FPGA 14 determines that the clock signal outputted from the CPU 12 is unstable, and changes the PLL_LOCK signal to low level at time t8.

If it is determined that the clock signal supplied from the CPU 12 is continuously unstable for a predetermined period of time, that is, that the PLL_LOCK signal remains at low level, the CPU 12 outputs a manual reset request signal to the reset IC 16 at time t9. A pulse signal outputted from the PORT_A terminal 12*b* at time t9 in FIG. 5 is the manual reset request signal.

The reset IC 16 resets the CPU 12 in response to the manual reset request signal generated at time t9. At this point, the DONE signal from the FPGA 14 is changed to low level indicating that the configuration is not complete. That is, the FPGA 14, too, returns to the initial state.

The reset IC 16 cancels the reset of the CPU 12 and the FPGA 14 at time t10.

When the reset is cancelled, the FPGA 14 reads out configuration data from the ROM 18 and performs a configuration. On completion of the configuration, the FPGA 14 outputs a DONE signal at time t11.

The FPGA 14 determines whether the clock signal supplied from the CPU 12 is stable or not. On determining that the clock signal supplied from the CPU 12 is stable, the FPGA 14 changes the PLL_LOCK signal to high level at time t12.

From this point onward, the CPU 12 and the FPGA 14 start executing predetermined processing if the PLL_LOCK signal is kept at high level. That is, in the example shown in FIG. 5, at time t9, the reset IC 16 resets the CPU 12 and the FPGA 14 to restart in response to the manual reset request from the CPU 12. If it is determined that the clock signal supplied from the CPU 12 is stable as the result of the restart, the CPU 12 and the FPGA 14 start executing predetermined processing. If it is not determined that the clock signal supplied from the CPU 12 is stable as the result of the restart, the reset IC 16 resets the CPU 12 and the FPGA 14 to restart in response to the manual reset request from the CPU 12.

As described above, in the information processing device 10 according to at least one embodiment, the configuration execution unit 31 writes configuration data into the FPGA 14. The clock signal monitoring unit 23 detects whether the clock signal supplied from the CPU 12 to the FPGA 14 is stable or not, on condition that the configuration execution unit 31 has completed the configuration. The startup processing unit 24 starts up the CPU 12 and the FPGA 14 on condition that the clock signal is stable. Therefore, even if the clock signal outputted from the CPU 12 becomes unstable, the CPU 12 and the FPGA 14 can be securely started up after the clock signal becomes stable.

In the information processing device 10 according to the embodiment, the FPGA state monitoring unit 21 determines whether the configuration is complete or not, based on the state of the DONE signal outputted from the FPGA 14. Therefore, the completion of the configuration can be determined securely and easily.

In the information processing device 10 according to at least one embodiment, the clock signal monitoring unit 23 determines whether the clock signal supplied from the CPU 12 to the FPGA 14 is stable or not, based on the phase difference and the frequency difference between the clock signal supplied from the CPU 12 to the FPGA 14 and the clock signal generated by the FPGA 14. Therefore, whether the clock signal is stable or not can be determined securely and easily.

In the information processing device 10 according to at least one embodiment, the startup processing unit 24 performs a manual reset on the CPU 12 and the FPGA 14 on condition that the clock signal supplied from the CPU 12 to the FPGA 14 is unstable over a predetermined period of time. Therefore, if the clock signal outputted from the CPU 12 becomes unstable, the CPU 12 and the FPGA 14 can be started up after the clock signal becomes stable.

While some embodiments have been described, these embodiments are presented simply as examples and are not intended to limit the scope of the disclosure. These novel embodiments can be carried out in various other forms and can include various omissions, replacements, and modifications without departing from the spirit and scope of the disclosure. These embodiments and the modifications thereof are included in the scope of the disclosure and also included in the scope of the claims and equivalents thereof.

What is claimed is:

1. An information processing device including a field-programmable gate array (FPGA) and a central processing unit (CPU), the device comprising:
   at least one processor configured to write configuration data into the FPGA;
   a clock signal monitor configured to detect whether a clock signal supplied from the CPU to the FPGA is stable or not, on condition that a configuration is complete;
   the at least one processor being configured to start up the CPU and the FPGA on condition that the clock signal is stable.

2. The device according to claim 1, wherein
   the at least one processor is configured to determine that the configuration is complete, based on a state of a signal outputted from the FPGA.

3. The device according to claim 1, wherein
   the clock signal monitor is configured to determine whether or not the clock signal supplied from the CPU to the FPGA is stable, based on a phase difference and a frequency difference between the clock signal supplied from the CPU to the FPGA and a clock signal generated by the FPGA.

4. The device according to claim 1, wherein
   the at least one processor is configured to perform a manual reset on the CPU and the FPGA on condition that the clock signal supplied from the CPU to the FPGA is unstable over a predetermined period of time.

5. The device according to claim 1, further comprising a reset integrated circuit (IC) configured to perform the manual reset on the CPU and the FPGA.

6. The device according to claim 5, wherein the reset IC is configured to perform a forced reset on the CPU and the FPGA.

7. The device according to claim 5, wherein the reset IC is configured to perform a reset cancellation on the CPU and the FPGA.

8. The device according to claim 1, wherein the at least one processor is implemented by at least one of the FPGA or the CPU.

9. The device according to claim 1, wherein the clock signal monitor is part of the CPU.

10. An information processing method causing a computer including a field-programmable gate array (FPGA) and a central processing unit (CPU) to perform:
    configuration processing in which the FPGA reads configuration data;
    clock signal monitoring processing in which a state of a clock signal supplied from the CPU to the FPGA is detected on condition that a configuration is complete; and
    startup processing in which the CPU and the FPGA are started up on condition that the clock signal is stable.

11. The method according to claim 10, further comprising determining that the configuration is complete, based on a state of a signal outputted from the FPGA.

12. The method according to claim 10, further comprising determining whether or not the clock signal supplied from the CPU to the FPGA is stable, based on a phase difference and a frequency difference between the clock signal supplied from the CPU to the FPGA and a clock signal generated by the FPGA.

13. The method according to claim 10, further comprising performing a manual reset on the CPU and the FPGA on condition that the clock signal supplied from the CPU to the FPGA is unstable over a predetermined period of time.

14. The method according to claim 13, further comprising performing a forced reset on the CPU and the FPGA.

15. The method according to claim 13, further comprising performing a reset cancellation on the CPU and the FPGA.

* * * * *